June 27, 1950 L. L. WALKER, JR 2,513,259
COTTON HARVESTER AND CLEANER
Filed Jan. 11, 1946 4 Sheets-Sheet 1
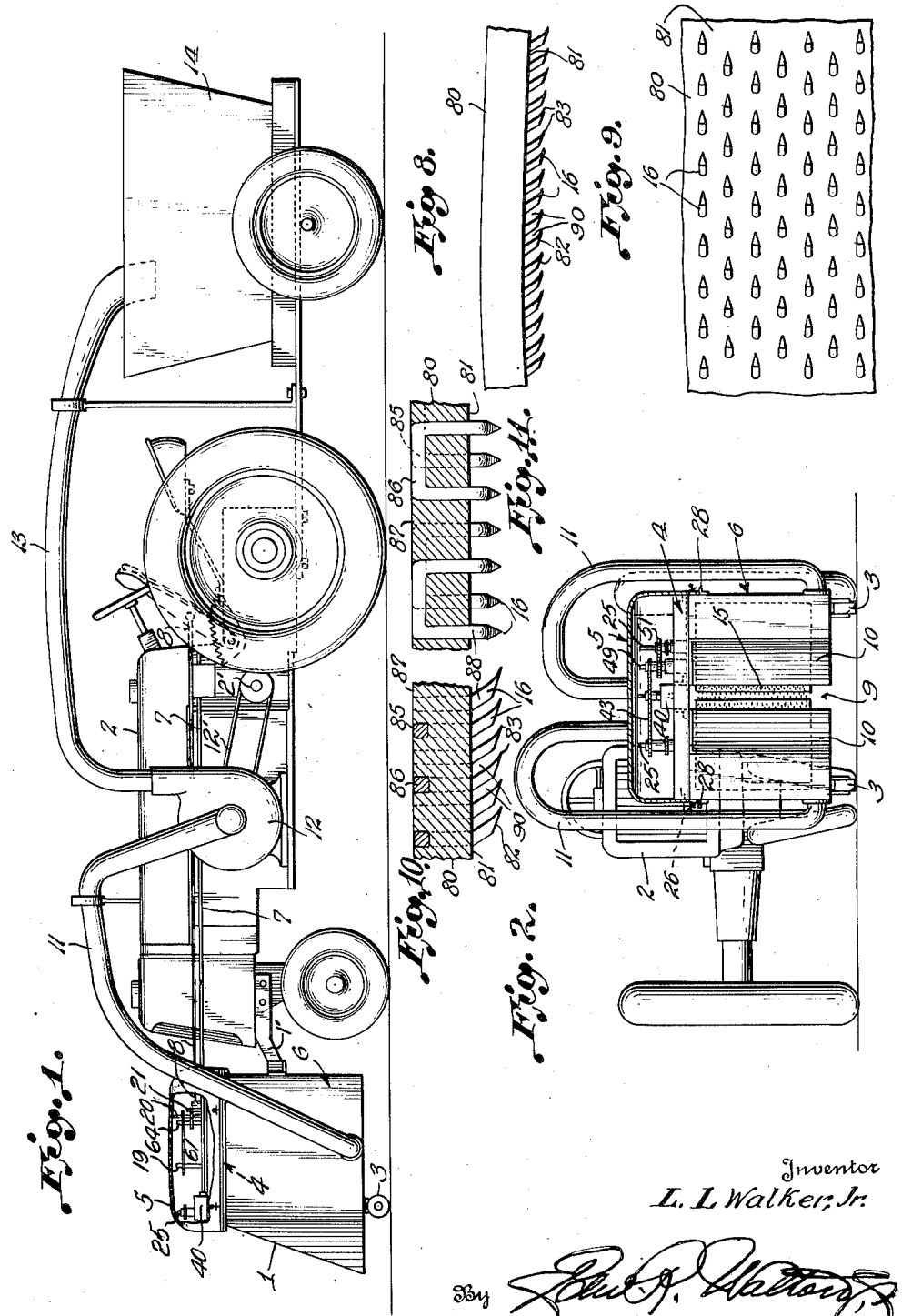
Inventor
L. L. Walker, Jr.

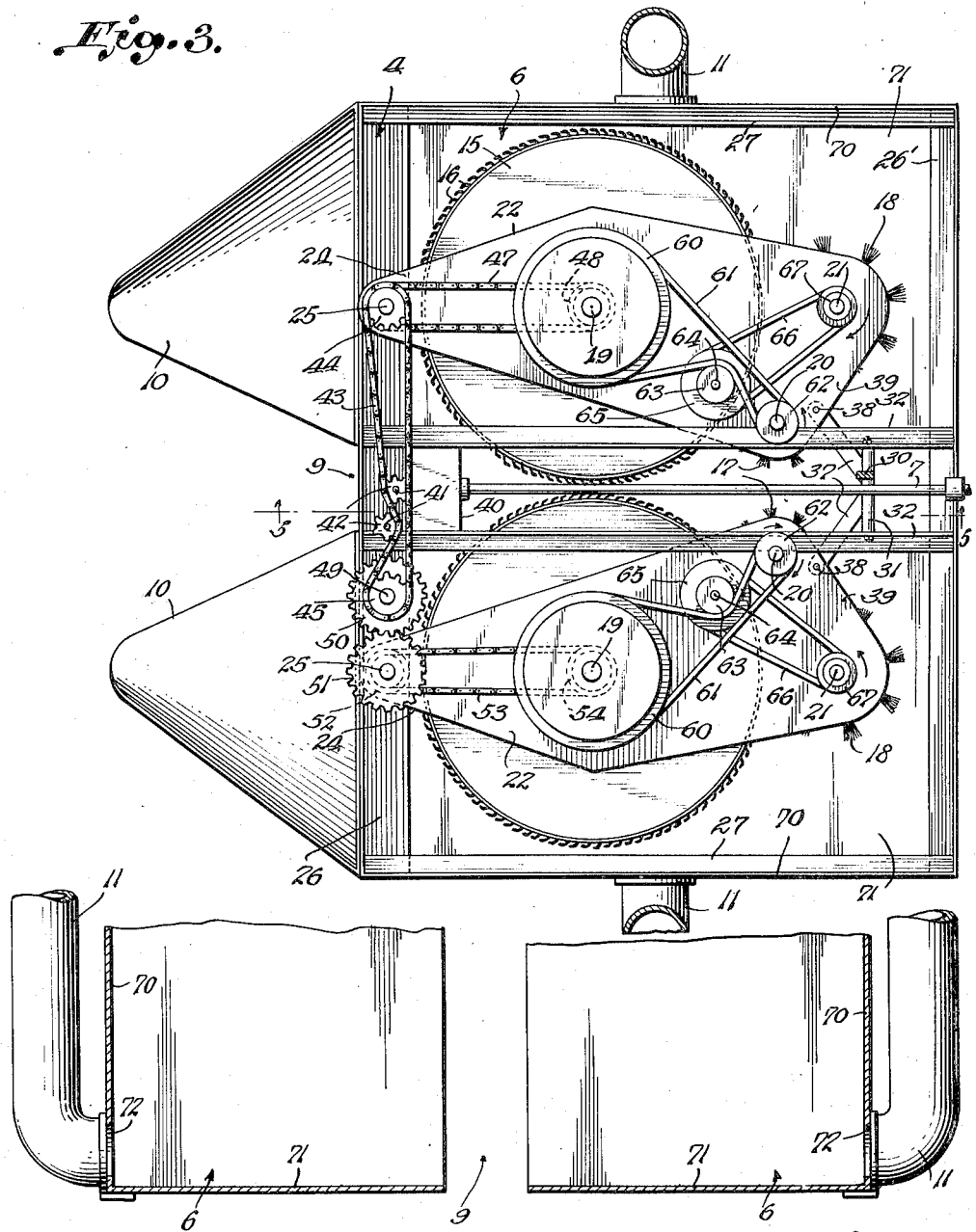

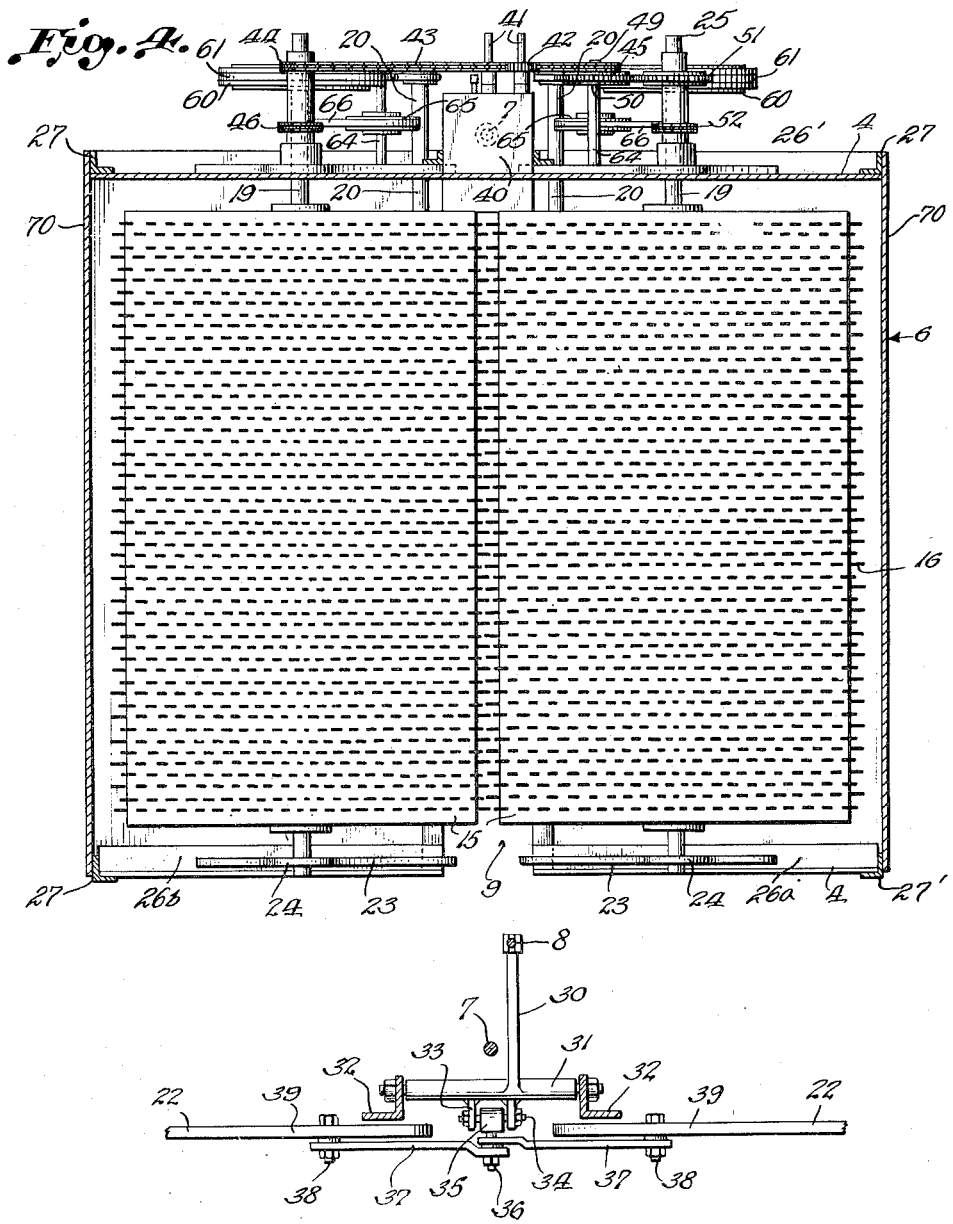

June 27, 1950     L. L. WALKER, JR     2,513,259
COTTON HARVESTER AND CLEANER
Filed Jan. 11, 1946     4 Sheets—Sheet 4
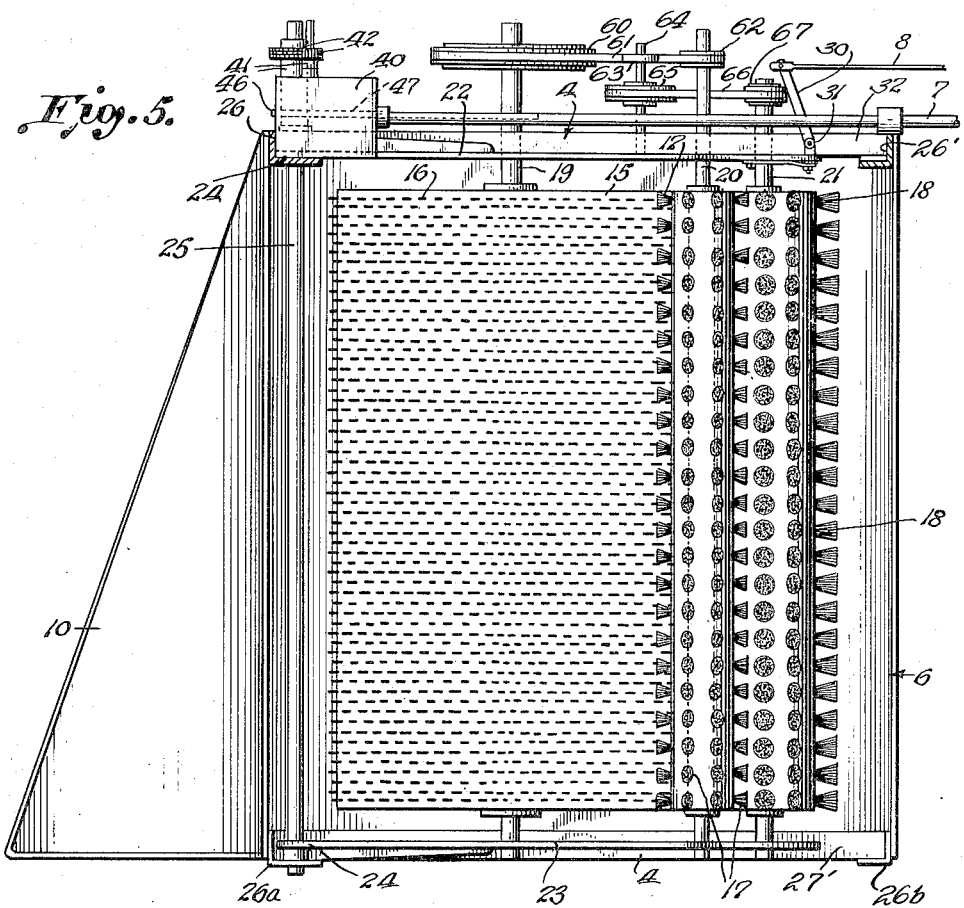
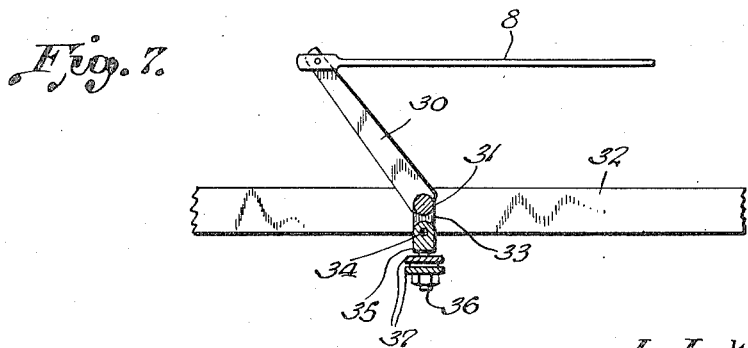
Inventor
L. L. Walker, Jr.
Attorney

UNITED STATES PATENT OFFICE 2,513,259

COTTON HARVESTER AND CLEANER

Louie L. Walker, Jr., Highlandale, Miss.

Application January 11, 1946, Serial No. 640,558

13 Claims. (Cl. 56—30)

This invention relates to harvesters and more particularly to cotton harvesters of the type adapted to remove cotton from the plants while moving along a row of cotton plants in the field.

Machines of this type usually comprise a pair of drums having hooks or spikes over their surfaces and are adapted to be moved along a row of cotton plants with one drum on each side of the row, so that the plants are passed between the drums and the cotton is hooked on the spikes carried by the drum, rotatable brushes being usually mounted behind the drums to remove the cotton from the drum spikes. In some prior art machines the drums are fixed in their spaced relationship in which event large cotton plants are crushed between the drums and the small plants are not properly contacted by one or both of the drums, while in other prior art proposals the drums are spring-pressed to a minimum spacing and yield under the pressure of the plants passing therebetween to separate further—in either case the plant is crushed unduly and much trash is gathered with the cotton. Thus, the arrangement of the picker drums of these machines have been incapable of harvesting relatively clean cotton; furthermore, due to the type and arrangement of the spikes on the picker drums, the spikes are responsible for the collection of even a greater amount of trash along with the locks of cotton. Moreover, the prior art machines have been unsatisfactory in their operation in general, have been complicated in design and uneconomical in construction, operation and maintenance.

Having in mind the defects of the prior art apparatus, it is an object of this invention to overcome the above enumerated and other faults of the machines, and to provide a field row cotton harvester that is capable of collecting substantially clean cotton directly from the cotton plants. It has been endeavored to design the picker elements and the spikes carried thereby so that the locks of cotton are plucked from the bolls without collecting an appreciable amount of trash. Furthermore, it is contemplated that the machine shall be readily and easily adjustable to vary manually the spacing of the picker elements according to field conditions, as encountered, to eliminate material damage to the plants and to reduce the possibility of collecting trash with the locks of cotton. Additionally, it is within the conception of the invention that the machine should be capable of cleaning the cotton after it is plucked from the plants and before it has been discharged from the machine. Moreover, it is desirable that the cleaned cotton be discharged from the machine and collected in a suitable collector for removing it from the field. It is necessary that the machine be mechanically "fool-proof," be capable of instant control, and comprise an economy of construction and simplicity of design.

The foregoing objects and others ancillary thereto are preferably accomplished in accordance with a preferred embodiment of this invention by providing a pair of rotatable picker drums with a plurality of small spikes covering their surfaces. Adjustably mounted with each of the drums and in tangential relation therewith are cleaner and doffer brushes. The cleaner brushes are rotated in a direction opposite to the direction of the drums to brush any trash from the cotton lint on the drums, and the doffer brushes are rotated in the same direction as the drums to brush the cotton lint from the drums. Each drum, with its associated brushes, is mounted in a frame as an individual unit. The frames are pivotally mounted at their front ends so that they may be swung through a limited angle, and means are provided for simultaneously swinging the frames by the operator to regulate the space between the drums. A drive system is arranged to accommodate the swinging movement of the drum and brush assemblies. The whole structure is adapted to be mounted in front of a power unit, such as a tractor, whereby the operator may have full vision of the machine and of the row it is traversing and thereby be in a position to control the machine in accordance with the immediate conditions. A pneumatic conveyor means is arranged to receive the cleaned cotton locks as they are doffed from the drum and to discharge them into a suitable collector.

The novel features that are considered characteristic of this invention are set forth with particularity in the appended claims. The invention itself, however, both as to its organization and its method of operation, together with additional objects and advantages thereof, will best be understood from the following description of a specific embodiment, when read in connection with the accompanying drawings wherein like reference characters indicate like parts throughout, and in which:

Figure 1 is a side view in elevation of the present cotton harvester mounted in front of a tractor and showing control and drive connections as well as the conveying arrangement for transporting the cotton from the harvester to a collector;

Figure 2 is a front view in elevation of the machine shown in Fig. 1;

Figure 3 is a top plan view of the harvester with the cover removed to show the drive mechanism;

Figure 4 is a front view in elevation of the picking drums and the drive mechanism, the housing being in cross-section;

Figure 5 is a cross-sectional view taken on line 5—5 of Fig. 3 and showing one drum with its associated cleaner and doffer brushes in elevation;

Figures 6 and 7 are detailed views of the control mechanism for regulating the spacing of the picker drums;

Figures 8, 9, 10 and 11 are fragmentary views of the cotton picking spikes carried by the drums and showing the manner in which they are mounted;

Figure 12 is a fragmentary view in cross-section of the lower part of the housing enclosing the drums and showing the discharge to the pneumatic conveying means.

In general, as shown in Figs. 1 and 2 of the drawings, the present invention comprises a harvester 1 adapted to be mounted in any suitable manner, as by the hitching bar 1', to the front end of a tractor 2. The harvester 1 is provided with a suitable means for travelling, such as the rollers 3, and comprises a box-like frame 4 formed by front and rear upper cross members 26 and 26' and side members 27, which are joined in any usual manner, such as by welding or riveting. This frame supports an upper housing 5 enclosing the drive and control mechanism and a lower housing 6 containing the picker mechanism. The upper housing is simply a pressed sheet-metal cover or cowling, as shown in Figs. 1 and 2, which protects the mechanism located therein from the weather. In Fig. 2, in particular, it is shown as fitting down over the upper frame members and the uper edges of the lower housing and resting upon angle irons 28 attached in any suitable manner outside the side walls 70 of the latter. The lower housing has a floor 71 for a purpose which will be described hereinafter. Front and rear lower cross members 26a and 26b and lower side members 27' of the frame 4 are connected in suitable manner to the side walls 70 of the lower housing. The drive mechanism in the upper housing is powered by a drive shaft 7 connected to the power take-off (not shown) of the tractor. The drum spacing control mechanism is connected with a control rod 8 extending to the tractor operator's station so that it may be operated while the apparatus is in motion. It will be seen in Fig. 2 that the lower housing 6 of the harvester is divided longitudinally to form a vertical channel 9 therethrough, each side containing a set of cotton picker devices and having guide members 10 extending from the fronts thereof which cooperate to funnel the cotton plants through the vertical channel 9 in the center of the apparatus and between the picker devices. The lower housing 6 is connected by pipes 11 through a blower 12, mounted on, and driven by the tractor 2, and discharge pipes 13 with a suitable collector 14, such as the trailer shown in Fig. 1. The blower 12 may be driven by means of a belt 12' and a power take-off 2' of the tractor 2, or in any other desired manner. Fig. 1 is more or less diagrammatic and it is to be understood that the various details need not be of the type such as those shown. It is customary, for instance, to removably attach the trailer 14 to the tractor 2 rather than to have it bolted thereto.

As best shown in Figs. 3, 4 and 5, each side of the lower housing 6 contains a picker drum 15 having a large number of small spikes 16 positioned over its surface for hooking the locks of cotton from the bolls on the plants. Adjacent to each drum are two rotary brushes 17 and 18 whose peripheries are substantially tangent to the peripheries of the picker drum. One of these brushes 17 which is smaller than the other, is mounted closer to the center of the apparatus and immediately behind the point of contact of the drums with the cotton plant. This brush 17 is rotated in the same direction as the drum 15 so that the tangential surfaces of the brush 17 and the drum 15 travel in opposite directions. This brush 17 is adapted to clean the cotton that is caught on the drum 15 by brushing the locks of cotton deeper into the hooks or throats of the spikes 16 and by brushing off any trash that may have adhered to the locks, throwing the trash back towards the plants where it drops through the vertical channel 9 in the machine to the ground. The positioning and spacing of the cleaner brush 17 with respect to the drum 15 will not permit the passage of the heavier, tougher and thicker particles of trash into the machine with the locks of cotton.

The larger brush 18 is positioned at the rear of the drum 15 and rotates in a direction opposite to that of the drum 15 so that their tangential peripheries move in the same direction. This brush 18 is rotated at a higher speed than that of the drum 15 so that it will brush or doff the cotton from between the spikes 16 into the lower housing 6 behind the drum 15, throwing it to the sidewall of the housing, where it is withdrawn by suction through the conveyor pipes 11. It may be noted that specific reference is made to the drums 15 as the picker elements and it is customary to use drums for this purpose.

Customarily the picking drums are mounted in stationary positions in which event they are too far apart to contact the cotton on scrawny or thin plants and are too close together for properly handling heavy, bushy plants. In the latter case, the plants are crushed and considerable trash is collected along with the cotton lint. In order to overcome these defects, it has been proposed to movably mount the drums and resiliently position them relative to each other. By this construction, the drums are capable of collecting the cotton lint from plants of all sizes. It is disadvantageous, however, in view of the fact that the drums exert pressure against even normal-sized plants, thereby mashing them, and, it is almost as destructive to the large plants as the stationary drums. In the present construction, as seen in Figs. 3 and 5, the picker elements are movably mounted but their spacing is under the control of the operator. Each drum 15 and its associated cleaner and doffer brushes 17 and 18 are mounted on vertical shafts 19, 20 and 21, respectively, whose ends are supported by upper and lower horizontal plates 22 and 23. The front ends 24 of these plates 22 and 23 are pivotally mounted on upright shafts 25 carried by the front bars 26 of the frame 4. By this arrangement each of the drum and brush assemblies are formed as individual units, each of which may be pivoted through an arc about its supporting upright shaft 25. This mounting is provided to permit adjustment of the spacing of the drums 15 relative to each other. The drums 15 may be moved closer together when traversing a row composed of small, thin plants, or they may be moved apart to accommodate large, bushy plants without danger of crushing the plants or collecting trash from the crushed plants.

The spacing of the drum assemblies is accomplished by a control mechanism which is shown in detail in Figs. 6 and 7. A bell crank lever 30 is mounted on a stub shaft 31 extending between two central braces 32 in the top of the frame 4. The upper end of the bell crank 30 is connected to the control rod 8 which extends back to the operator's position on the tractor 2, and the lower end of the bell crank 30 is divided into a U-shaped lever 33 that straddles and is connected by a horizontal pivot 34 to a universal link 35. This link is, in turn, connected by a vertical pivot 36 to a pair of toggle links 37 each of whose outer ends, respectively, are pivoted at 38 to the rear ends 39 of each of the upper drum supporting plates 22. By pulling or pushing the control rod 8, the bell crank lever 30 is swung about its shaft 31 and thereby moves the universal link 35 forwardly or rearwardly. The movement of the link 35, in turn, swings the adjoining ends of the toggle links 37 to either push the drum supporting plates 22 apart or to pull them together, according to the direction of movement. The drums 15 are never permitted to be moved into contact with each other, however, as their inward movement is limited by upper frame bars 32 acting as a stop with respect to the cleaner brush shafts 20.

As can best be seen in Figs. 3 and 4, the drums and brushes are rotated through the medium of the drive shaft 7 that extends to a gear box 40 mounted on the front frame 26 of the housing 1. The gears within the box turn the axis of the drive 90° and drive two vertical shafts 41 extending from the top of the box 40. Spur sprockets 42, which are mounted on the vertical shafts 41, mesh with a chain 43 that engages two sprockets 44 and 45 which are spaced from each side of the gear box 40. One of the sprockets 44 is mounted directly on one of the upright plate supporting shafts 25 and is joined with a second sprocket 46 that is connected by a second chain 47 with a sprocket 48 fixed to one of the drum shafts 19. The other of said sprockets 45 is mounted on an upright stub shaft 49 carried by the front frame 26 and is integral with a gear 50. This gear 50 meshes with a second gear 51 that is mounted on the other upright plate supporting shaft 25. The second gear 51 is joined with a sprocket 52 that is connected by another secondary chain 53 with a sprocket 54 fixed to the other drum shaft 19. The intermediate gears 50 and 51 are necessary in the latter case to reverse the direction of rotation of the second drum 15 so that the adjacent peripheries of the drums 15 will move in the same direction.

In view of the foregoing description it will be understood that the drive shaft 7, receiving power from the take-off on the tractor 2, drives the gears within the gear box 40, which in turn drive the upright shafts 41 and their spur sprockets 42. These sprockets 42 drive the main chain 43 which drives the spaced sprockets 44 and 45, one on each side of the machine. The latter sprockets 44 and 45 are integral or joined with a secondary sprocket 46 and a gear 50 respectively. The gear 50 meshes with a second gear 51 that is integral or joined with another secondary sprocket 52. The gears 50 and 51 reverse the direction of drive so that the two secondary sprockets 46 and 52 are rotated in opposite directions and accordingly drive in opposite directions the secondary chains 47 and 53 which drive the sprockets 48 and 54 carried by the drum shafts 19. It naturally follows that the drums are driven in opposite directions and are rotated from their fronts toward each other. The peripheral speed of the drums may be varied, however, it must be in excess of the forward travel of the machine in feet per minute.

It will be noted from the above description that the drum drive is positive in nature and consequently there can be no failure of rotation on the part of the drums 15. The drive for the brushes 17 and 18, however, is not positive, but is frictional, because they are not subject to the same strain as the drums 15, and there, a more economical construction may be employed. The brushes 17 and 18 are driven from their associated drums by means of pulleys and belts. Pulleys 60 are fixed to each of the drum shafts 19 and connected by belts 61 with pulleys 62 fixed to their respective cleaner brush shafts 20. Idler pulleys 63 are mounted on upright shafts 64 carried by the upper drum supporting plates 22. They are located intermediate the drum and cleaner pulleys 60 and 62 and are in driving contact with the belts 61 between said pulleys 60 and 62. The idler pulleys 62 are integral or co-mounted with large pulleys 65 that are connected by belts 66 with pulleys 67 fixed to the doffer brush shafts 21. The drum shaft pulleys 60 are quite large whereas, the cleaner brush and intermediate pulleys 62 and 63 are small. The belts 61 connect the drums 15 and cleaner brushes 17 so that their shafts 19 and 20 are driven in the same direction. Consequently, their adjacent peripheries move in opposite directions, the peripheries of the cleaner brushes 17 traveling at a higher rate of speed than those of the drums 15. Due to the drive connections of the doffer brushes 18 through the intermediate pulleys 63—65, they are rotated in opposite directions to the drums 15 so that their adjacent peripheries travel in the same direction.

In view of the foregoing description it should be evident that the drive shaft 7 from the tractor 2 transmits rotary motion to the 90° gear box 40 which transmits the rotary motion to the upright shafts 41 supporting the spur gears 42 which drive the main chain 43. The main chain 43 in turn, through the medium of joint sprockets 44—46 drives the secondary chain 47 that drives one of the drums 15, and also through the medium of joint sprockets and gears 45—50 and 51—52 drives the other secondary chain 53 which rotates the other drum 15. Each of the drum shafts 19 drive the cleaner brush shafts 20 by a directly connected belt 61 and also drive the doffer brush shafts 21 by means of the intermediate idler pulleys 63—65 in contact with the drum-cleaner belts 61 and connected to the doffer brush shafts 21 by secondary belts 66. The drum pulleys 60 are substantially larger than the cleaner brush pulleys 62 and accordingly said brushes 17 will be rotated at a higher speed than said drums 15, in order to vigorously brush the cotton locks that are caught on the drum spikes 16. The idler pulleys 63 are also considerably smaller than the drum pulleys 60 so that their speed will be increased, and their associated pulleys 65 are substantially larger than the doffer brush pulleys 67 so that the speed of the doffer brushes 18 are increased in two stages. The doffer brushes 18 must rotate at a substantially higher speed than the drums 15 in order to remove the cotton locks from beneath the hooks of the spikes 16.

When the doffer brushes 18 remove the locks of cotton from the spikes 16 of the picking drums 15 the locks are thrown to the sidewalls 70 of the lower housing 6 and dropped to the floor 71 beneath the drums 15. The cotton is not permitted to accumulate within the housing 6, however, as it is subject to the suction of the conveyor pipes 11 as soon as it approaches the floor 71. As shown in Fig. 12, the conveyor pipes 11 are joined to the housing 6 at the bottom of the sidewalls 70 thereof and are in communication with the interior of the housing 6 by means of openings 72 in the sidewalls that are almost at floor level. The cotton is drawn through the suction pipes 11 to the pump 12, from which it is blown through the discharge pipes 13 to the trailer or other suitable collector 14.

The present invention contemplates a distinct advantage over the prior usages, however, and the drums 15 are preferably formed by covering the circumference of ordinary smooth-walled drums with sheets of card clothing such as that shown in Figs. 8 and 9. This card clothing, which is also known as card belting, comprises a sheet 80 that may be formed in one piece or in any desired manner, such as laminating layers of canvas, leather or any other desired material or combination of materials, which sheets have the spikes 16 extending from one surface 81 thereof. The spikes 16 extend angularly with respect to the surface 81 at an acute throat angle of the clothing 80 and are preferably sharpened in a single plane 82 extending from their leading edges 83 rearwardly and which is not quite parallel but slightly tilted downwardly with respect to the surface 81 of the sheet 80. The details of these spikes are better shown in Figs. 10 and 11 wherein it may be seen that the spikes 16 are actually in the form of staples 85 that have their joining portion 86 embedded in the rear surface 87 of the sheeting 80 with their spiked ends 88 extending from the other surfaces 81 of said sheeting 80. The spikes 16 are bent at the point where they emerge from the sheeting 80 so that the exposed portions thereof are positioned angularly with respect to the sheeting surface 81.

The clothing 80 is mounted on the drums 15 so that the spikes 16 are bent in the direction of rotation of the drums 15. The card spikes 16 are set closely together and staggered in rows as best illustrated in the enlarged views in Figs. 10 and 11. Actually, the spikes are spaced apart approximately the same distance that they project above the drum periphery in the order of about forty spikes per square inch. This arrangement provides, in the spike end faces 82, a front of resistance to trash and yet, the spike points 83 are sufficiently spaced to readily catch the locks of cotton lint. In other words, the front of resistance to trash offers no resistance to the acceptance of the cotton. Furthermore, the spikes 16 are of moderate length, the front formed by the spike end faces 82 being in the neighborhood of one-sixteenth of an inch above the surface 81 of the sheet 80. The short length of the spikes 16 therefore precludes the acceptance and retention of trash, which is relatively bulky, within the throats 90 formed by the spikes 16 and the sheet 80, but the length is sufficient to accept and hold on to the cotton. It is to be understood that teeth of this type may be set directly on the drum surface, but there is an economy of construction in using the card clothing. There is a distinct advantage to the use of the card spike, as above described, whether it is mounted on a drum or other device which can move the spike in a horizontal, inclined or vertical direction relative to the cotton plant. Furthermore, the use of the clothing has the advantage of being capable of slipping relative to the drum in the event that it becomes jammed for any reason, and of being capable of ready replacement. An additional advantage of the card cloth is that it lends itself to use as a belt which may be run over a system of pulleys or rollers if it is desired to present a flat surface to the cotton plants as a picking medium.

The collecting or picking and retaining action of the card spikes 16 relative to the locks of cotton lint is of particular importance in view of the cleaning to which the cotton is subjected. Even though the spikes 16 do not collect an appreciable amount of trash, a considerable amount of the tough bolls and some of the stalks will adhere to the cotton as it is picked. Heretofore, this trash has been collected, along with the cotton, and subsequently separated and removed when the cotton was processed in the cotton gin. By means of the present invention, however, this trash has barely broken loose from the plant when it is brushed from the cotton lint by the cleaner brushes. Any of this trash which is present is merely clinging to and suspended in the locks of cotton, and the reverse action of the cleaner brush 17 tends to dislodge and remove this trash, simultaneously driving the cotton locks deeper into the throats 90 formed by the spikes 16 so that it is retained on the drum 15 and carried past the cleaner brush 17. The degree or effect of cleaning is governed by two settings of the cleaner brush 17, which are the relative spacing of the peripheries of the brush 17 and the drum 15, and the relative peripheral speeds of the brush 17 and the drum 15. It naturally follows that with the locks of cotton driven deep into the throats 90 of the spikes 16, the action of the doffer brush 18 must be vigorous and its peripheral speed substantially higher than that of the drum 15.

In operation, the harvester 1 is mounted on a tractor 2 as hereinbefore described, and shown in Fig. 1, and driven along the rows of cotton plants in the field so that the guide members 10 on the front of the harvester 1 span the rows and more or less funnel the plants into the machine where the picking drums 15 straddle the plants. The tractor operator in his driving position has full vision of the plants as they enter the machine and can adjust the spacing of the picker drums 15 by means of the control rod 8 from time to time as the machine traverses the rows in the field. This is prticularly important in view of the fact that there is considerable variation in the size and productivity of the plants within the same row. There are usually favorable spots in a field where the soil is of superior quality and moisture conditions are better than the average and again there are usually bad spots in a field where the soil is poor, rocky and arid. It naturally follows that in the more favorable spots the plants will be larger, bushier and produce more and larger bolls than the average, whereas in the poor spots the plants will be stunted, considerably smaller and less productive than the average.

With the present harvester 1 these conditions can be readily met by the facility with which the operator can adjust the machine while it is both in operation and in motion. The drums 15 and brushes 17 and 18 being driven through the medium of the drive shaft 7 connected with the power take-off on the tractor 2, can likewise be controlled by the operator from time to time by adjusting the speed of the power take-off. Similarly, the power of the conveyor blower 12 may be adjusted by the operator to accommodate the immediate conditions in view of the fact that it is likewise driven from a power take-off on the tractor 2. Thus the machine in one operation, picks the cotton, collecting all the cotton regardless of field conditions, without including trash from the plants, removes the trash that does adhere to the cotton, and delivers the clean cotton lint to a suitable collector 14, such as the trailer or a mobile baler.

Although certain specific embodiments of the invention are not shown and described, it is quite obvious that many modifications thereof are possible. The invention, therefore, is not to be restricted except insofar as is necessitated by the prior art and by the spirit of the appended claims.

That which is claimed, as new, is:

1. In a machine for harvesting cotton from rows of plants in the field, a housing that is centrally divided to form an upright, open-bottomed channel to straddle a row of cotton plants, a rotatable drum mounted in an upright position in each side of said housing adjacent to said channel, the periphery of said drum being covered with a plurality of closely positioned relatively short spikes extending from its outer surface toward the direction of rotation of said drum, a rotatable cleaner brush mounted in an upright position on each side of said housing adjacent to said drum and to said channel, a rotatable doffer brush mounted in an upright position on each side of said housing adjacent to the back of said drum, the peripheries of said cleaner and doffer brushes being substantially in tangential relation with the periphery of said drum, a pair of vertically spaced horizontally movable members mounted in each side of the housing, each of said drums and its associated cleaner and doffer brushes having their axes in parallel relationship and being journaled in the said horizontal members to form a unit, means for moving the units to space them relative to each other with the adjacent peripheries of the drums within the channel, and drive means adapted to rotate said drums and brushes.

2. In a machine for harvesting cotton from rows of plants in the field, a housing that is centrally divided to form an upright, open-bottomed channel to straddle a row of cotton plants, a rotatable drum mounted in an upright position in each side of said housing adjacent to said channel, the periphery of said drum being covered with a plurality of spikes extending from its outer surface toward the direction of rotation of said drum, a rotatable cleaner brush mounted in an upright position in each side of said housing adjacent to said drum and to said channel, a rotatable doffer brush mounted in an upright position in each side of said housing adjacent to the back of said drum, and drive means mounted on said housing and adapted to rotate said drums and brushes, said drive means being arranged to rotate said drums from the front toward each other at a peripheral speed in feet per minute in excess of the forward travel of the machine in feet per minute, to rotate said cleaner brushes in the same direction as the drums so that the adjacent drum and cleaner brush peripheries travel in opposite directions, and to rotate said doffer brushes in the opposite direction to the drums so that the adjacent drum and doffer brush peripheries travel in the same direction.

3. In a machine for harvesting cotton from rows of plants in the field, a housing that is centrally divided to form an upright, open-bottomed channel to straddle a row of cotton plants, a rotatable drum mounted in an upright position in each side of said housing adjacent to said channel, the periphery of said drum being covered with a plurality of closely positioned relatively short spikes extending from its outer surface toward the direction of rotation of said drum, a rotatable cleaner brush mounted in an upright position in each side of said housing adjacent to said drum and to said channel, a rotatable doffer brush mounted in an upright position in each side of said housing adjacent to the back of said drum, the peripheries of said cleaner and doffer brushes being substantially in tangential relation with the periphery of said drum, a pair of vertically spaced horizontally movable members mounted in each side of the housing, each of said drums and its associated cleaner and doffer brushes having their axes in parallel relationship and being journaled in the said horizontal members to form a unit, means for moving the units to space them relative to each other with the adjacent peripheries of the drums within the channels, and drive means mounted on said structure and adapted to rotate said drums and brushes, said drive means being arranged to rotate said drums from the front toward each other at a peripheral speed in feet per minute in excess of the forward travel of the machine in feet per minute, to rotate said cleaner brushes in the same direction as the drums so that the adjacent drum and cleaner brush peripheries travel in opposite directions, and to rotate said doffer brushes in the opposite direction to the drums so that the adjacent drum and doffer brush peripheries travel in the same direction.

4. In a machine for harvesting cotton from rows of plants in the field, a housing that is centrally divided to form an upright, open-bottomed channel to straddle a row of cotton plants, a rotatable drum mounted in an upright position in each side of said housing adjacent to said channel, card clothing covering the peripheral surface of said drum and having a plurality of closely positioned relatively short spikes extending from the outer surface of said card clothing toward the direction of rotation of said drum, said spikes being adapted to hook cotton lint from the plants within said channel, a rotatable cleaner brush mounted in an upright position in each side of said housing adjacent to its respective drum and to said channel, said cleaner brush being adapted to brush off the trash that adheres to the cotton lint caught on the card spikes and to throw said trash back into said channel, a rotatable doffer brush mounted in an upright position in each side of said housing adjacent to the back of its respective drum, said doffer brush being adapted to brush the cotton lint from the card spikes into said housing, the peripheries of said cleaner and doffer brushes being substantially in tangential relation with the periphery of their respective drums, a pair of vertically spaced horizontal members swingably mounted at each side of the housing to the front thereof, each of said drums and its associated cleaner and doffer brushes having their axes in parallel relationship and being journaled in the said horizontal members to form a unit, means for swinging the units to space them relatively to each other with the adjacent peripheries of the drums within the channel, drive means mounted on said housing and including elements which are coaxial with the pivot points of said units, said drive means being adapted to rotate said drums and brushes and being arranged to rotate said drums from the front toward each other at a peripheral speed in feet per minute in excess of the forward travel of the machine in feet per minute, to rotate said cleaner brushes at a speed in excess of that of the drums and in the same direction as the drums so that the adjacent drum and cleaner brush peripheries travel in opposite directions, and to rotate said doffer brushes at a speed substantially in excess of that of the drums and in the opposite direction to the drums so that the adjacent drum and doffer brush peripheries travel in the same direction, and pneumatic conveyor means for removing said cotton lint from said housing to a point of collection.

5. In a machine for harvesting cotton picker drum of cylindrical form rotatable on a vertical axis, means for rotating the drum in one direction, a plurality of spikes on the periphery of the picker drum and pointing in the direction of operational rotation, a cylindrical cleaner brush rotatably mounted on a vertical axis and substantially parallel to the picker drum with its periphery lying adjacent to the drum periphery to contact the cotton thereon, and means for rotating the cleaner brush in the same direction as the picker drum whereby adjacent peripheral surfaces move in opposite directions and the cotton is forced against the seizing and gripping action of the spikes and the cotton is firmly enmeshed thereon while being cleaned by said brush, and means for cleaning the seized cotton from the picker drum.

6. In a machine for harvesting cotton, a rotatable picker drum of cylindrical form, means for rotating the drum in one direction at a given peripheral speed, a plurality of picker spikes on the periphery of the picker drum and pointing in the direction of operational rotation, a cylindrical cleaner brush rotatably mounted substantially parallel to the picker drum with its periphery lying adjacent to the drum periphery to contact the cotton thereon, means for rotating the cleaner brush in the same direction as the picker drum whereby adjacent peripheral surfaces move in opposite directions, a cylindrical doffer brush rotatably mounted substantially parallel to the picker drum with its periphery lying adjacent to the drum periphery to contact the cotton thereon, and means for rotating the doffer brush in the opposite direction to the picker drum at greater peripheral speed whereby the adjacent surfaces will move in the same direction.

7. In a machine for harvesting cotton, a housing having a plant-receiving channel, a cylindrical picker drum mounted in the housing for rotating on a vertical axis and having its peripheral surface projecting into the channel, a plurality of spikes on the periphery of the picker drum and pointing in the same direction, means for rotating the picker drum in the direction the spikes point, a cylindrical cleaner brush rotatably mounted substantially parallel to the picker drum with its periphery lying adjacent to the drum periphery to contact the cotton thereon and being disposed to eject trash from the cotton into the housing channel, means for rotating the cleaner brush in the same operational direction as the picker drum whereby adjacent peripheral surfaces move in opposite directions, a cylindrical doffer brush rotatably mounted parallel to the picker drum with its periphery lying adjacent to the drum periphery to contact the cotton thereon and being disposed in the housing on the opposite side of the cleaner brush with respect to the channel, and means for rotating the doffer brush in a direction opposite to the direction of operational rotation of the picker drum and at greater peripheral speed whereby adjacent peripheral surfaces move in the same direction.

8. In a machine for harvesting cotton, a housing having a plant-receiving channel adapted to straddle a cotton row in operation, a pair of vertically spaced horizontal members mounted for oscillating movement on a vertical axis in the housing on each side of the channel, a cotton picking-cleaning-doffing unit supported by each pair of horizontal members and comprising a picker drum mounted for rotation on a vertical axis and projecting into the housing channel, a plurality of relatively short spikes set closely together on the periphery of the picker drum and being inclined at an acute throat angle in planes at right angles to the drum axis and pointing toward the rear of the channel when moving through the same, each spike being in the form of a parallel sided bar having its outer end cut at such an angle that the end face is nearly parallel to a plane tangential to the drum periphery and is spaced about one-sixteenth of an inch above the said periphery, the spacing of the spikes being approximately equal to the distance of their ends from the drum periphery in the order of about forty spikes per square inch whereby a front is presented to resist penetration of plant foliage and trash into the throat angles of the spikes while freely permitting seizure of cotton locks, means for rotating the picker drum in the direction in which its spikes face, a cleaner brush mounted for rotation parallel to the picker drum with its periphery lying adjacent to the drum periphery to contact the cotton thereon and disposed to project into the housing channel in rear of the similarly projecting picker drum periphery with respect to movement of the housing along a row, means for rotating the cleaner brush in the same direction as the operational rotation of the picker drum whereby adjacent surfaces move in opposite directions, a doffer brush mounted parallel to the picker drum with its periphery lying adjacent to the drum periphery to contact the cotton thereon and disposed in the housing on the opposite side of the cleaner brush with respect to the channel, and means for rotating the doffer brush in a direction opposite to the operational rotation of the picker drum whereby adjacent surfaces move in the same direction and at peripheral speed greater than that of the picker drum, and manual means for swinging the horizontal members which support the picker-cleaner-doffer units on their axes to adjust the space between the picker drums in the housing channel.

9. A machine for harvesting cotton comprising a frame, means for supporting the frame for movement along a cotton row, a housing carried by the frame and having a plant-receiving channel, a vertical shaft mounted in the housing at each side of the channel near one end of the latter, a pair of vertically spaced horizontal members rotatably mounted on each shaft, a picker drum mounted between the horizontal members of each pair and journalled therein for rotation on a vertical axis, driving means operatively connected to each drum, and manually operable means connected to both of said pairs of horizontal members for adjusting said opposed pairs of horizontal members toward and from each other to vary the spacing of the picker drums to accommodate cotton plants of different sizes.

10. A machine for harvesting cotton comprising a frame, means for supporting the frame for movement along a cotton row, a housing carried by the frame and having a plant-receiving channel, a vertical shaft mounted in the housing at each side of the channel near one end of the latter, a pair of vertically spaced horizontal members pivotally supported loosely on each shaft, a picker drum mounted between the horizontal members of each pair and journalled therein for rotation on a vertical axis, driving means operatively connected to each drum, a doffer brush journalled between the horizontal members of each pair on a vertical axis and lying adjacent to the corresponding drum for contact with the cotton thereon, a cleaner brush journalled between the horizontal member of each pair and lying adjacent to the corresponding drum for contact with the cotton thereon, driving means operatively connecting each picker drum with its cleaner brush, additional driving means operatively connecting the doffer brush with the driving beans for the cleaner brush, and means for oscillating the opposed pairs of horizontal members in opposite directions to vary the spacing between the picker drums.

11. A machine for harvesting cotton comprising a frame, means for supporting the frame for movement along a cotton row, a housing carried by the frame and having a plant-receiving channel, a vertical shaft mounted in the housing at each side of the channel near one end of the latter, a pair of vertically spaced horizontal members pivotally supported loosely on each shaft for oscillation in the housing, a picker drum mounted between the horizontal members of each pair and journalled therein for rotation on a vertical axis, a plurality of spikes projecting from the peripheral surface of each picker drum and pointing in the direction of rotation, driving means operatively connected to each drum, a cleaner brush journalled between the horizontal members of each pair on a vertical axis and lying adjacent to the corresponding picker drum, a pulley fixedly connected to each picker drum for rotation therewith, a pulley fixedly connected to the cleaner brush for rotation therewith, an open belt operatively connecting the picker drum and cleaner brush pulleys, a doffer brush journalled between the horizontal members of each pair for rotation on a vertical axis and lying adjacent to the corresponding picker drum, a pulley fixedly connected to each doffer brush for rotation therewith, an integral pair of idler pulleys journalled on one horizontal member of each pair with one pulley in operative contact with the belt connecting the corresponding drum pulley with the pulley of its cleaner brush, a second open belt connecting the other idler pulley of the same pair with the doffer brush pulley, and means for oscillating the opposed pairs of horizontal members in opposite directions.

12. In a machine for harvesting cotton, a supporting structure having a plant passage, at least one pair of vertically spaced carrier members supported on said supporting structure and horizontally pivoted on a substantially vertical axis, a picker drum rotatably carried substantially vertically by and between said carrier members, an adjustable mechanism connected to one of said carrier members and adjustably mounted on the supporting structure, said adjustable mechanism including a manually adjustable control element and a linkage connection between the control element and the carrier member or members, whereby said carrier members and picker drum may be adjusted horizontally and transversely of the plant passage.

13. In a machine for harvesting cotton, a supporting structure having a plant passage, an upright supporting shaft on the structure at each side of the plant passage, a pair of vertically spaced carrier members horizontally pivotal on each of said supporting shafts, a picker drum rotatably carried vertically by and between each pair of carrier members, and a manually adjustable mechanism connected to one of the carrier members of each pair and operable to move said pairs of carrier members and their picker drums toward and from each other at the will of the operator to any one of a plurality of relatively spaced positions as said plants pass through said passage.

LOUIE L. WALKER, Jr.

REFERENCES CITED

The following references are of record in the file of this patent:

UNITED STATES PATENTS

| Number | Name | Date |
| --- | --- | --- |
| 183,433 | Stoddard et al. | Oct. 17, 1876 |
| 285,856 | Todd | Oct. 2, 1883 |
| 439,794 | Todd | Nov. 4, 1890 |
| 1,323,089 | Neil | Nov. 25, 1919 |
| 1,396,012 | Alvin | Nov. 8, 1921 |
| 1,590,174 | Hall | June 22, 1926 |
| 1,722,747 | Hentz | July 30, 1929 |
| 1,895,160 | Green | Jan. 24, 1933 |
| 2,208,570 | Box | July 23, 1940 |